(12) United States Patent
Musser

(10) Patent No.: US 8,316,549 B2
(45) Date of Patent: Nov. 27, 2012

(54) COMPOUND LEVERAGE HAND TOOL WITH INTERCHANGEABLE TOOL HEAD

(75) Inventor: Scott Musser, Sturgis, MI (US)

(73) Assignee: Midwest Tool And Cutlery Company, Sturgis, MI (US)

( * ) Notice: Subject to any disclaimer, the term of this patent is extended or adjusted under 35 U.S.C. 154(b) by 454 days.

(21) Appl. No.: 12/764,156

(22) Filed: Apr. 21, 2010

(65) Prior Publication Data

US 2011/0131814 A1   Jun. 9, 2011

Related U.S. Application Data

(60) Provisional application No. 61/285,057, filed on Dec. 9, 2009.

(51) Int. Cl.
*B25B 7/02* (2006.01)

(52) U.S. Cl. ............... 30/260; 81/423; 81/427.5; 7/129; 30/262

(58) Field of Classification Search ............ 30/260–262, 30/266, 236, 329, 341, 186–188, 160, 161; 7/125–135; 81/421–424, 416, 427.5
See application file for complete search history.

(56) References Cited

U.S. PATENT DOCUMENTS

| | | | | |
|---|---|---|---|---|
| 2,507,710 A | | 5/1950 | Grosso | |
| 4,169,312 A | * | 10/1979 | Mar | 30/337 |
| 4,238,862 A | * | 12/1980 | Leatherman | 7/128 |
| 5,664,274 A | * | 9/1997 | Collins | 7/129 |
| 5,884,540 A | * | 3/1999 | Mo | 81/423 |
| D427,501 S | * | 7/2000 | Berg et al. | D8/105 |
| 6,088,860 A | * | 7/2000 | Poehlmann et al. | 7/128 |
| 6,088,861 A | * | 7/2000 | Sessions et al. | 7/128 |
| 6,108,845 A | | 8/2000 | Hung et al. | |
| 6,131,495 A | | 10/2000 | Chen | |
| 6,250,184 B1 | | 6/2001 | Chang | |
| 6,282,995 B1 | * | 9/2001 | Lin | 81/423 |
| 6,336,387 B1 | | 1/2002 | Lee | |
| 6,574,870 B1 | | 6/2003 | Huang | |
| 6,612,147 B2 | * | 9/2003 | Beetz et al. | 72/409.16 |
| 6,647,835 B1 | * | 11/2003 | Tseng | 81/423 |
| 6,707,007 B1 | * | 3/2004 | Siddoway | 219/231 |
| D488,700 S | * | 4/2004 | Montague | D8/331 |
| 6,721,983 B2 | * | 4/2004 | Dallas et al. | 7/128 |
| 7,210,230 B2 | | 5/2007 | Wurzel | |
| 7,346,991 B1 | | 3/2008 | Janson | |
| 7,347,128 B2 | * | 3/2008 | Rivera et al. | 81/450 |
| 7,568,408 B2 | * | 8/2009 | Tsuda | 81/427.5 |
| 7,596,870 B2 | * | 10/2009 | Klecker et al. | 30/236 |
| 2006/0200913 A1 | * | 9/2006 | Guan | 7/128 |
| 2008/0072716 A1 | * | 3/2008 | Chen | 81/423 |
| 2009/0113721 A1 | | 5/2009 | Robinson et al. | |

\* cited by examiner

*Primary Examiner* — Andrea Wellington
*Assistant Examiner* — Brendan Ayer
(74) *Attorney, Agent, or Firm* — Frank H. Foster; Kremblas & Foster

(57) ABSTRACT

A compound leverage hand tool with an interchangeable tool head. The tool includes a pair of pivotably interconnected handles and a tool head defined by a pair of pivotably interconnected blade members. Each blade member terminates at one end in a mounting dowel that is pivotably mounted in a pair of retention slots in one of the handles. Tool head latches are pivotably mounted to the handles and include locking fingers that extend over the retention slots. The tool head latches can be pivoted relative to the handles between a locked position, wherein the locking fingers prevent the mounting dowels from being removed from the handles, and an unlocked position, wherein the mounting dowels can be removed from the handles. A spring biases the tool head latches toward the locked position. To unlock the tool head latches and remove the tool head, a user engages a tool head latch and pulls the handles apart.

6 Claims, 4 Drawing Sheets

COMPOUND LEVERAGE HAND TOOL WITH INTERCHANGEABLE TOOL HEAD

CROSS-REFERENCES TO RELATED APPLICATIONS

This application claims the benefit of U.S. Provisional Application No. 61/285,057 filed Dec. 9, 2009.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

This invention relates generally to the field of hand tools and relates more particularly to a compound leverage hand tool with an interchangeable tool head.

Compound leverage hand tools (also called "compound action" hand tools) generally include a pair of pivotally interconnected handles which are each also pivotally connected at one end to a tool head. The tool head includes a pair of pivotally interconnected workpiece engaging members, which can include snips blades, pliers jaws, seamer blades, clamps or the like. The manner in which the components of a compound leverage tool are pivotally linked to one another provides a user of the tool with a mechanical advantage relative to traditional, non-compound leverage hand tools. That is, the various levers created by the multiple pivotal connections of such a tool allow a user to impart a greater amount of force to the closing of the tool head (and to the workpiece) as compared to a non-compound leverage hand tool, for the same amount of force applied to the tools' handles.

A disadvantage of compound leverage hand tools is that the tool heads of such tools are typically integral with, and not removable from, the handle portion of the tool. Therefore, if the tool head becomes worn or damaged in such a way that renders it ineffective or unusable, such as by being dulled, dented or cracked, the entire tool must be disposed of and replaced, including the handle portion of the tool which may still be in good working condition. Such replacement is not only wasteful, but can be very expensive due to the relatively high cost of most compound leverage hand tools. Similarly, with inseparable tool heads, a separate complete tool must be purchased for each tool head. That not only increases the total cost, but also means that the entire set of hand tools can be stored less compactly.

It is therefore an object and feature of the present invention to provide a compound leverage hand tool with a tool head that can be easily replaced using only the hands of the user without requiring the use of any additional tool to perform such replacement when the tool head becomes ineffective or unusable.

It is a further object and feature of the present invention to provide such a hand tool with interchangeable tool heads of various different types, including, but not limited to snips blades, pliers jaws, seamer blades and clamps for accommodating a variety of different tasks without requiring a user to purchase and maintain several different, single-purpose compound leverage hand tools.

BRIEF SUMMARY OF THE INVENTION

In accordance with the present invention, there is provided a compound leverage hand tool having an interchangeable tool head. The hand tool includes a pair of handles that are pivotably connected to each other by a main pivot pin. Each handle has a hand grip at one end and terminates at the other end in a pair of retention claws that define a pair of laterally aligned, U-shaped retention slots. The tool head of the hand tool includes, for example, a pair of pivotably interconnected blade members, each terminating at one end in a transverse mounting dowel. The mounting dowels of the tool head are pivotably seated in the retention slots of the handles in a perpendicular orientation relative to the plane on which blade members pivotably travel during operation of the hand tool; that is parallel to the axis of the main pivot pin.

Tool head latches are pivotably mounted to each of the handles, with each tool head latch having a locking finger that extends over the retention slot of its respective handle. The tool head latches can be pivoted relative to the handles between a locked position, in which the locking fingers of the tool head latches block the open ends of the retention slots and prevent the mounting dowels of the tool head from being withdrawn therefrom, and an unlocked position, in which the locking fingers are shifted away from the open ends of the retention slots and the mounting dowels of the tool head are allowed to be withdrawn therefrom.

Each tool head latch has a latch pin that extends through an elongated guide hole in its respective handle. When the tool head latches are in their locked positions the latch pins are positioned against the outermost edges of their respective elongated guide holes, and when the tool head latches are in their unlocked positions the latch pins are positioned against the innermost edges of their respective elongated guide holes. A spring engages the latch pins and biases the latch pins outwardly, against the outermost edges of the elongated guide holes, thereby biasing the tool head latches toward their closed positions and simultaneously biasing the handles open. The hand tool is thereby spring-loaded for allowing a user to operate the hand tool with one hand and the tool head latches are thereby held in their locked positions for preventing the tool head from being removed from the handles during normal operation of the tool.

A handle latch is pivotally connected at one end to the latch pin of one of the tool head latches and preferably has a hooked end for removably engaging the latch pin of the other tool head latch. If a user wishes to replace the removable tool head, the user engages the tool latch to lock the latch pins together. The user then pulls the handles of the tool apart, thereby pivoting the elongated guide holes of the handles outwardly relative to the interlocked latch pins. The handles are pulled apart, away from the stationary latch pins, until the latch pins seat against the innermost edges of their respective elongated guide holes. This causes the retention slots to pivot inwardly about the axis of the main pivot pin and away from the locking fingers to their unlocked positions. After the retention claws have been pivoted thusly, the locking fingers of the tool head latches no longer block the open ends of the retention slots. The mounting dowels of the tool head can then be withdrawn from the retention slots and the tool head can be separated from the handles. A new or different tool head can then be installed and the handles can be squeezed back together to move the tool head latches back to their locked positions for securing the new tool head to the handles.

Figure 1:
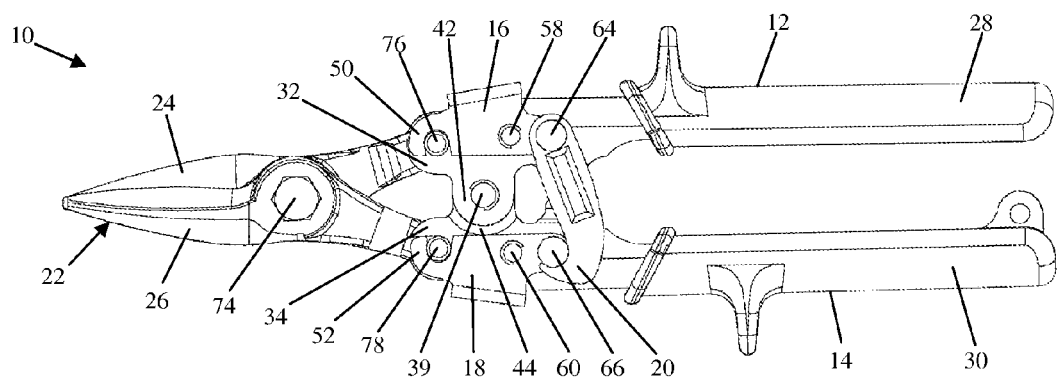
FIG. 1 is a side view illustrating the preferred embodiment of the present invention with the handles in the closed position, the handle latch engaged, and the tool head latches in the locked position.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 2:
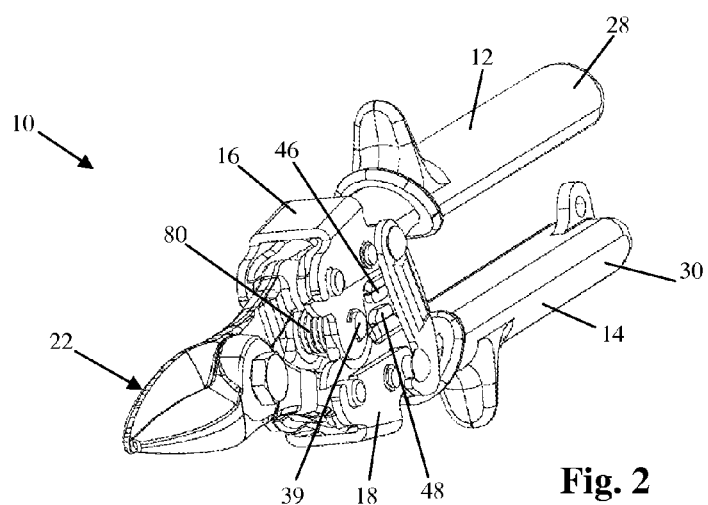
FIG. 2 is a perspective view illustrating the preferred embodiment of the present invention shown in FIG. 1.
Figure 3:
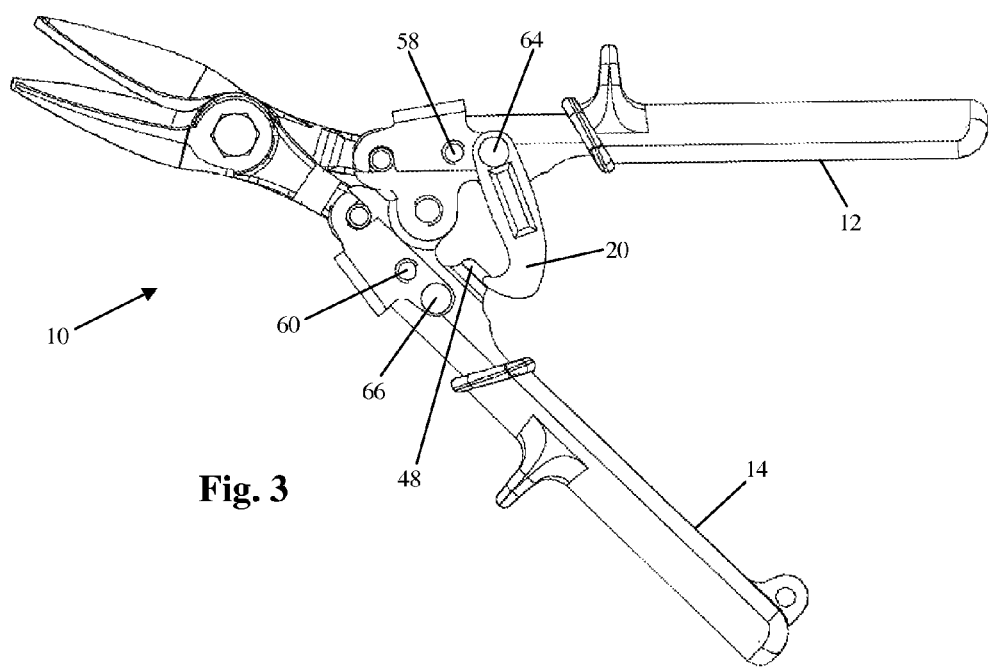
FIG. 3 is a side view illustrating the preferred embodiment of the present invention with the handles in the open position, the handle latch disengaged, and the tool head latches in the locked position.

Referring to FIGS. 1-3, an illustrative embodiment of a compound leverage, interchangeable-tool head hand tool in accordance with the present invention is indicated generally by the numeral 10. Referring to FIGS. 1 and 2, the tool 10 generally includes two pivotably interconnected handles 12 and 14, two tool head latches 16 and 18, a handle latch 20, and a removable tool head 22, for example a pair of pivotably interconnected blades 24 and 26. Unless otherwise noted, all components of the tool 10 are formed of conventional steel of the type used to fabricate common hand tools, although it is contemplated that the tool 10 can be formed of any other suitably rigid and durable material(s), including, but not limited to high carbon steel and titanium.

Figure 8:
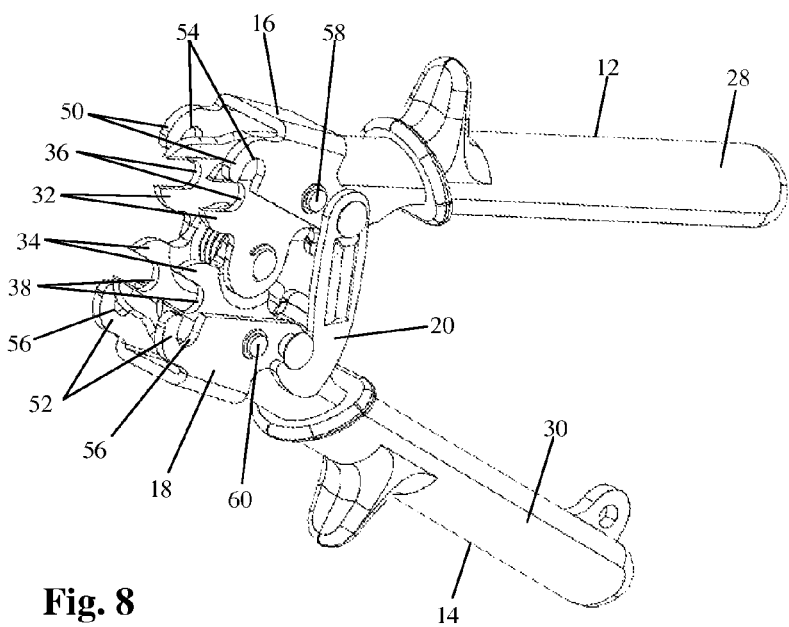
FIG. 8 is a perspective view illustrating the handle portion of the preferred embodiment of the present invention with the handle latch engaged and the tool head latches in the unlocked position.

Referring to FIGS. 1, 2 and 8, each of the handles 12 and 14 of the tool 10 terminates at a first end in a rubberized hand grip 28 and 30 and terminates at a second end in a pair of laterally spaced, U-shaped retention slots 36 and 38 (best shown in FIG. 8 and discussed in greater detail below). The handles 12 and 14, preferably having an inwardly opening u-shaped cross section and are pivotally connected to one another in oppositely facing relationship by a main pivot pin 39 that passes transversely through a pair of laterally-aligned connecting lobes 42 and 44 that extend inwardly from each of the handles 12 and 14. This configuration allows the handles 12 and 14 to be pivoted relative to one another about the longitudinal axis of the main pivot pin 39. Stop lobes 46 and 48 preferably extend inwardly from the handles 12 and 14 adjacent the connecting lobes 42 and 44 for engaging each other to prevent the handles 12 and 14 from being pivoted toward one another beyond a predetermined limit, although it is contemplated that the stop lobes 46 and 48 can be omitted from the tool.

Preferably, the retention slots 36 and 38 open longitudinally in a direction opposite and away from the hand grips as illustrated. However, it is possible for the retention slots to extend laterally outwardly or at an angle having a directional component in the lateral direction and a directional component in the longitudinal direction. As will be seen, forming the retention slots at the end of the handles enables their cooperation with a tool head latch for the removal and replacement of the removable tool head 22 in the easy manner that is subsequently described.

Still referring to FIGS. 1, 2 and 8, the tool head latches 16 and 18 are each generally inwardly opening, U-shaped members (in cross section—i.e. when viewed end-on in the longitudinal direction), each in cross section having two laterally-opposing legs joined by a third connecting wall. The tool head latches 16 and 18 fit over and conformingly engage the outer, exterior surfaces of the handles 12 and 14, adjacent retention claws 32 and 34 at the end of the handles and in which the retention slots 36 and 38 are formed. The laterally-opposing sidewalls (in cross section the legs of the U) of the tool head latches 16 and 18 snugly or frictionally engage the laterally-outwardly-facing surfaces of the handles 12 and 14. Laterally spaced, curved locking fingers 50 and 52 extend laterally inwardly from the tool head latches 16 and 18 and define pairs of laterally-aligned, U-shaped locking slots 54 and 56 laterally adjacent the retention slots 36 and 38 of the handles 12 and 14. The locking fingers 50 and 52 are each bifurcated into locking finger components formed on opposite inwardly extending legs of the U-shaped cross section of the tool head latches 16 and 18.

The tool head latches 16 and 18 are pivotably mounted to the handles 12 and 14 by tool head latch pivot pins 58 and 60 that pass transversely through laterally-aligned, circular apertures in the tool head latches 16 and 18 and in handles 12 and 14. The handles 12 and 14 are thereby able to pivot relative to tool head latches 16 and 18 about the axes of the tool head latch pivot pins 58 and 60. A snug engagement between the inwardly-facing surfaces of the laterally-opposing legs of the tool head latches 16 and 18 and the outwardly-facing surfaces of the handles 12 and 14 provides moderate frictional resistance against such movement which can, however, be overcome by comfortable hand manipulation. This pivoting of the handles 12 and 14 relative to the tool head latches 16 and 18 will be described in greater detail below.

Figure 4:
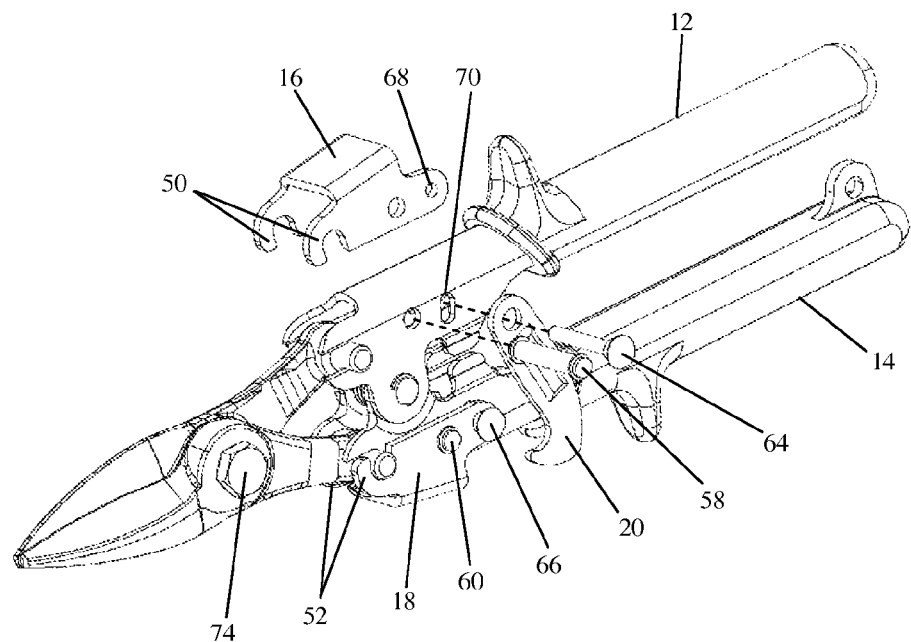
FIG. 4 is a partially exploded perspective view illustrating the preferred embodiment of the present invention shown in FIG. 1.

Referring to FIG. 4, latch pins 64 and 66 pass transversely through circular apertures 68 in the tool head latches 16 and 18 and through elongated guide holes 70 formed in the handles 12 (the circular aperture in the tool head latch 18 and the elongated guide hole in the handle 14 are not visible, but are symmetrically positioned and substantially identical to the circular aperture 68 and the guide hole 70). Thus, if the handles 12 and 14 are pivoted inwardly and outwardly relative to the tool head latches 16 and 18 and about the axes of the tool head latch pivot pins 58 and 60, the elongated guide holes 70 are correspondingly shifted inwardly or outwardly relative to their respective latch pins 64 and 66 extending therethrough. The hole edges at the ends of the guide holes 70 therefore limit the inward and outward movement of the handles 12 and 14 relative to the latch pins 64 and 66 and the tool head latches 16 and 18. However, this relative pivotal movement of the handles 12 and 14 with respect to the tool head latches 16 and 18 can only be accomplished with the handle latch 20 engaged with the latch pins 64 and 66 and is done only when changing tool heads in the manner subsequently described in more detail.

On each of the tool head latches 16 and 18, the locking fingers 50 and 52 are located on one side of the latch pivot axis through the latch pivot pins 58 and 60 and adjacent the retention slot of its respective handle. The latch pins 64 and 66 that extend through the elongated guide holes 70 are located on the other side of the latch pivot axis that extends longitudinally through the latch pivot pins 58 and 60. Consequently, each of the tool head latches 16 and 18 is a lever with an interposed fulcrum at the latch pivot pins 58 and 60, the locking fingers 50 and 52 nearer one end and the latch pins 64 and 66 nearer the other end. However, it is believed unnecessary that these three lever components all be located along a straight line.

In describing the structures embodying the invention, the term "respective" is used, such as the respective latch pins and the respective handles. The term "respective" is used to refer to a structure that is associated with, mounted to or cooperates with another structure. For example, in the phrase "the tool head latches and their respective handles", the "respective handles" means the handles to which the tool head latches are mounted and with which they each cooperate.

Figure 7:
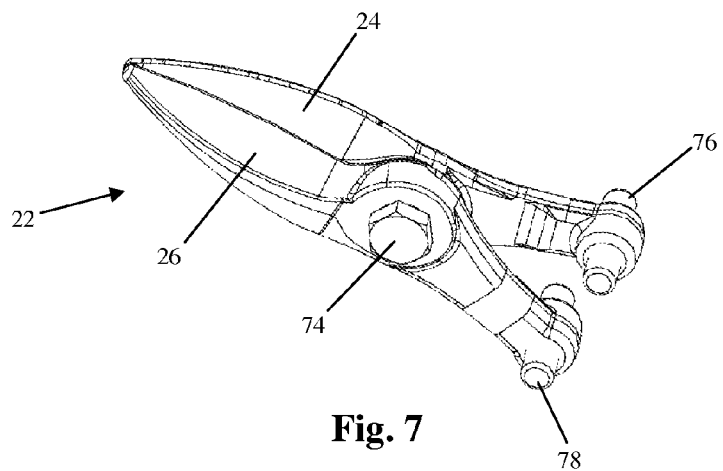
FIG. 7 is a perspective view illustrating the tool head of the preferred embodiment of the present invention.

Referring to FIGS. 1, 7, and 8, the tool head 22 includes a pair of blade members 24 and 26 that are pivotably-connected to one another intermediate their ends by a blade pivot pin 74 that passes transversely through laterally aligned apertures (not within view) in the blade members 24 and 26. Each blade member 24 and 26 terminates at one end in a transverse mounting dowel 76 and 78 that is preferably integral with, and that extends outwardly from both lateral sides of, its respective blade member 24 and 26. During normal operation of the tool, the mounting dowels 76 and 78 of the blade members 24 and 26 are seated within the retention slots 36 and 38 of the handles 12 and 14 with the tool head latches 16 and 18 in their locked positions, as shown in FIGS. 1-3. The locking fingers 50 and 52 of the tool head latches 16 and 18 thus extend over the open ends of the retention slots 36 and 38 to form enclosed apertures through which the mounting dowels 76 and 78 transversely extend. Situated thusly, the mounting dowels 76 and 78 are prevented from being withdrawn from their respective retention slots 36 and 38 while simultaneously being allowed to pivot about their respective axes within the apertures formed by the sidewalls of the retention slots 36 and 38 and locking fingers 50 and 52.

The mounting dowels 76 and 78 are oriented parallel to the main pivot pin 39; that is, perpendicular to the cutting plane on which edges of the blade members 24 and 26 of the tool head 22 travel during operation of the tool 10. The ability of the mounting dowels 76 and 78 to pivot about their respective axes, in cooperation with the main pivot pin 39 and the blade pivot pin 74, facilitates the compound lever action of the tool 10 which will be familiar to those skilled in the art. Specifically, when the hand grips 28 and 30 of the tool 10 are pivotably squeezed together about the axis of main pivot pin 39, the mounting dowels 76 and 78 are caused to move outwardly, away from each other and simultaneously pivot within their respective retention slots 36 and 38. That outward motion causes the blade members 24 and 26 to pivot about the blade pivot pin 74 and move the sharpened edges of the blade members 24 and 26 inwardly into engagement with each other and cut an interposed workpiece.

Although the tool head 22 is shown and described herein as including a pair of blade members 24 and 26 that define straight-pattern snips blades, it should be understood that virtually any other type of pivotably interconnected, workpiece-engaging tool head, including, but not limited to pliers jaws, seamer blades, and various other types of snips blades, can be substituted for the blade members 24 and 26 without departing from the present invention.

Figure 5:
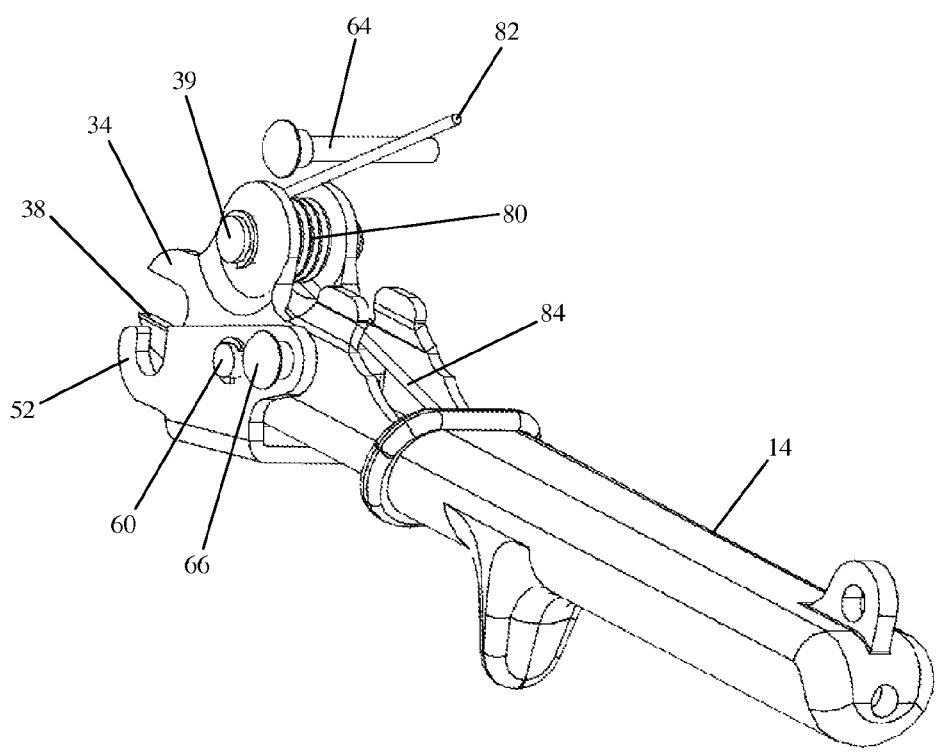
FIG. 5 is a partial view in perspective illustrating the preferred embodiment of the present invention with the tool head latch in the unlocked position.

Referring now particularly to FIGS. 2, 4 and 5, a compressed torsion spring 80 encircles the main pivot pin 39 and has two tines 82 and 84 that extend into the handles 12 and 14. The handle 12 and tool head latch 16 are removed in FIG. 5 so that the tine 82 and the latch pin 64 can be clearly viewed. The tines 82 and 84 of the torsion spring 80 engage the latch pins 64 and 66 and forcibly bias the latch pins 64 and 66 outwardly, against the outermost end edges of their respective elongated guide holes 70. This outward bias force in turn pivotably biases the tool head latches 16 and 18 toward their closed positions and pivotably biases the handles 12 and 14 away from each other, toward their open position. The latch pins 64 and 66 remain against the outermost edges of their respective elongated guide holes 70 during normal use of the tool.

During normal operation of the tool 10, the torsion spring 80 allows a user to operate the tool 10 with one hand in the manner of a conventional, spring-loaded hand tool by obviating the need for the user to manually pull the handles 12 and 14 apart after squeezing them together to engage a workpiece with the tool head 22. More importantly for the purpose of the present invention, the torsion spring 80 simultaneously forces and holds both of the tool head latches 16 and 18 into their closed positions through the application of constant, outward spring force on the latch pins 64 and 66. In this closed position, the locking fingers 50 and 52 of the tool head latches securely extend over and block the open ends of the retention slots 36 and 38 during use of the tool 10. That prevents the mounting dowels 76 and 78 of the tool head 22 from being withdrawn from the retention slots 36 and 38 and the tool head 22 from being detached from the handles 12 and 14. Although the torsion spring 80 is preferred for forcibly biasing the components of the tool 10 in the manner described above, it is contemplated that various other types of springs or spring-like structures can be substituted for the torsion spring 80. For example, a conventional coil spring or a volute spring can be mounted in compression intermediate the latch pins 64 and 66 for achieving a similar result.

Referring to FIGS. 1 and 3, a conventional, J-shaped handle latch 20 is pivotally connected at one end to the latch pin 64 and has a hooked end for removably engaging the opposing latch pin 66 (although it is contemplated that the handle latch 20 can alternatively be pivotably connected to the latch pin 66 and can removably engage the latch pin 64). When not in use, the tool 10 can be secured and stored in the closed position in a well known manner by squeezing the handles 12 and 14 together and pivoting the tool latch 20 to engage the latch pin 66, thereby holding the handles 12 and 14 together and preventing the torsion spring 80 from returning the handles 12 and 14 to their open position. More importantly for the purpose of the present invention, the handle latch 20 facilitates the removal and replacement of the tool head 22 in a unique manner that will now be described in detail.

Figure 6:
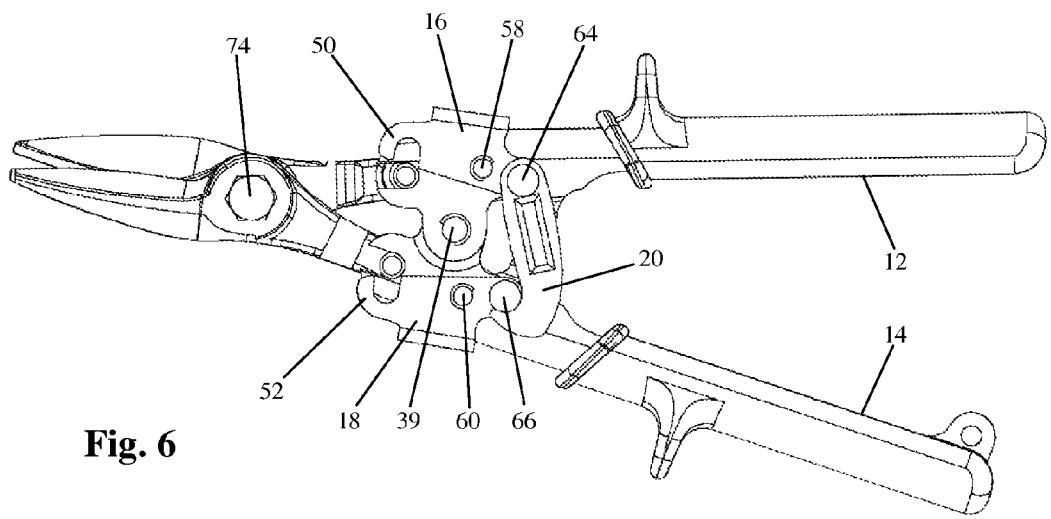
FIG. 6 is a side view illustrating the preferred embodiment of the present invention with the handle latch engaged and the tool head latches in the unlocked position.
Figure 9:
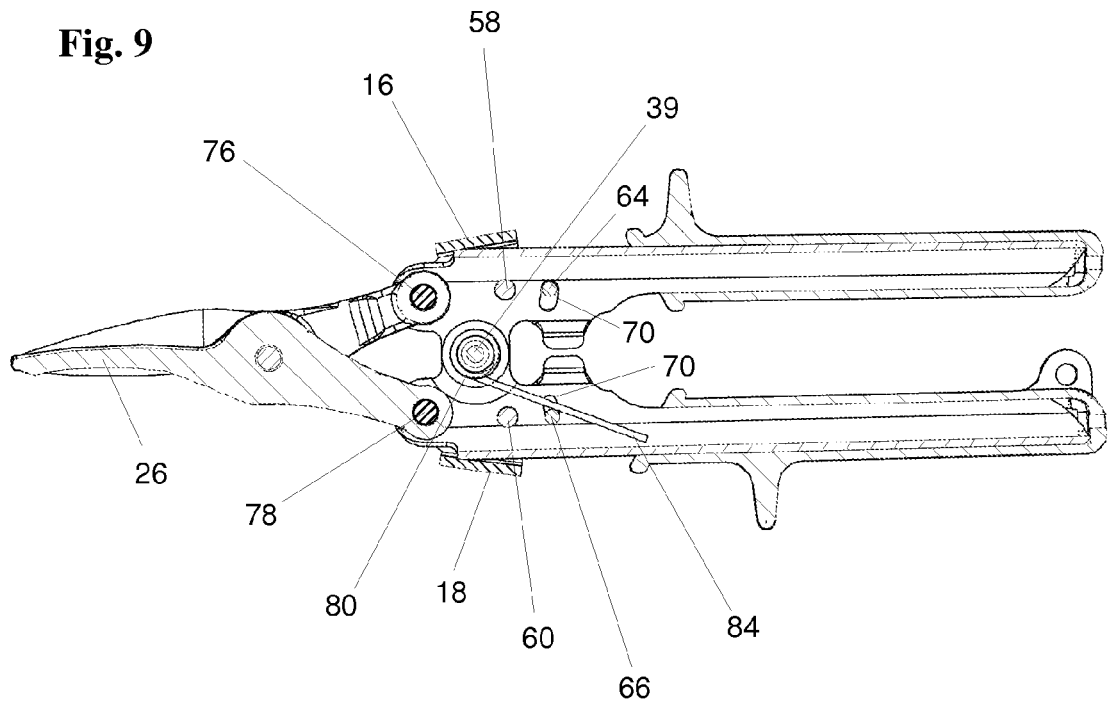
FIG. 9 is a view in section taken through a plane that is perpendicular to the pins of the preferred embodiment, passing through the blade member 26 and showing the preferred embodiment in its normal closed state.
Figure 10:
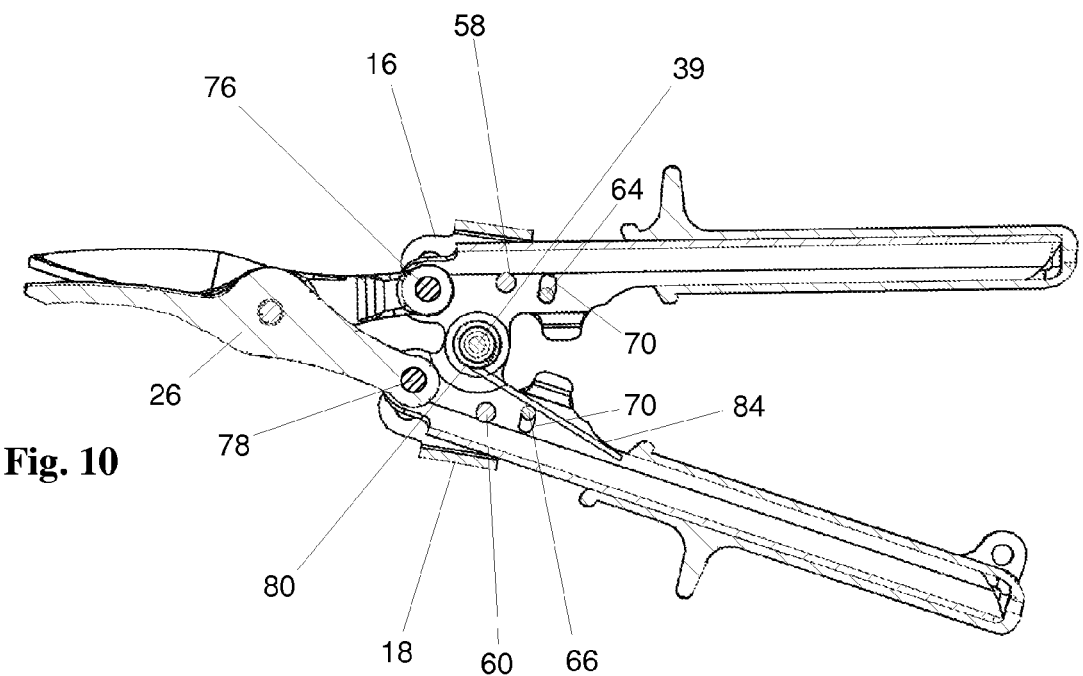
FIG. 10 is a view in section like FIG. 9, taken through a plane that is perpendicular to the pins of the preferred embodiment, passing through the blade member 26 and showing the preferred embodiment in its unlocked state in which the retentions slots are opened so that the tool head can be removed.

If a user wishes to replace the removable tool head 22 of the tool 10, the user first squeezes the handles 12 and 14 together and pivots the handle latch 20 to engage the latch pin 66 and lock the handles 12 and 14 in their closed position. At that stage the latch pins 64 and 66 are seated against the laterally outermost end of the elongated guide holes 70 as described above during normal usage and as illustrated in FIG. 9. Next, the user forces the grip ends of the handles 12 and 14 apart (preferably by pulling them apart using both hands), thereby pivoting the grip ends outwardly about the axis of the main pivot pin 39. Because the handle latch 20 is engaged, the latch pins 64 and 66 are held in place and can not move outwardly farther apart as the handles 12 and 14 are pivoted. The elongated guide holes 70 in the pivoting handles 12 and 14 are forced by the outward movement of the handles 12 and 14 to move outwardly relative to the latch pins 64 and 66. Sufficient outward movement of the handles 12 and 14 causes the latch pins 64 and 66 to eventually seat against the innermost edges or ends of their respective elongated guide holes 70 to the position illustrated in FIG. 10. No further pivoting of the handles 12 and 14 is possible. As the grip end of the handles 12 and 14 are moving apart and their elongated guide holes 70 are sliding outwardly along the latch pins 64 and 66, the retention slots 36 and 38 are pivoted inwardly toward each other and away from the locking fingers 50 and 52 of the tool head latches 16 and 18. The user need only apply a moderate amount of manual force to overcome the frictional engagement between the tool head latches 16 and 18 and the handles 12 and 14. Therefore, as the retention slots 36 and 38 move inwardly, they move away from the tool head latches 16 and 18 to their unlocked positions illustrated in FIG. 10. The locking fingers 50 and 52 of the tool head latches 16 and 18 thus no longer block the open ends of the retention slots 36 and 38 (as shown in FIGS. 6 and 8, the retention slots 36 and 38 are not within view in FIG. 6). The user can then let go of the handles 12 and 14 of the tool 10, with the frictional engagement between the inwardly facing surfaces of the tool head latches 16 and 18 and the outwardly-facing surfaces of the handles 12 and 14 being sufficient to hold the retention claws 32 and 34 and their retention slots 36 and 38 in their unlocked positions relative to the locking fingers 50 and 52 without any force being applied by the user.

With the retention claws 32 and 34 and their retention slots 36 and 38 sitting in the unlocked position, the mounting dowels 76 and 78 of the tool head 22 can be withdrawn from the retention slots 36 and 38 and the tool head 22 can be separated from the handles 12 and 14. A new or different tool head having mounting dowels similar to those of the tool head 22 can then be installed by inserting its mounting dowels into the retention slots 36 and 38. Then the grip ends of the handles 12 and 14 can be squeezed together to pivot the retention claws 32 and 34 with their the retention slots 36 and 38 outwardly back to the locked positions. The locking fingers 50 and 52 thereafter again block the open ends of the retention slots 36 and 38 and prevent the newly installed tool head from being removed from handles 12 and 14 of the tool 10 during operation.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A compound leverage hand tool comprising:
   a. a pair of handles pivotally interconnected at a handle pivot axis, each handle having a hand grip at a first end and an open ended retention slot at a second opposite end;
   b. a tool head having a pair of pivotally interconnected, workpiece engaging members, each workpiece engaging member terminating at one end in a transverse mounting dowel parallel to the handle pivot axis, each mounting dowel being pivotally seated in a different one of the retention slots;
   c. a pair of tool head latches, each tool head latch pivotably connected at a latch pivot axis to a different one of the handles and having a locking finger on one side of the latch pivot axis adjacent the retention slot of its respective handle, each tool head latch having a latch pin fixed to the tool head latch on the other side of the latch pivot axis and extending through an elongated guide hole through its respective handle, wherein the tool head latches are pivotable relative to the retention slots between a locked position, in which the locking fingers block the retention slots and prevent the mounting dowels of the tool head from being removed from the retention slots and the latch pins are adjacent outermost edges of the elongated guide holes, and an unlocked position, in which the locking fingers do not block the retention slots, the mounting dowels of the tool head are removable from the retention slots and the latch pins are adjacent innermost edges of the elongated guide holes;
   d. a spring intermediate the latch pins and biasing the latch pins outwardly toward the outermost edges of the elongated guide holes; and
   e. a handle latch pivotally mounted to one of the latch pins for removably engaging the other of the latch pins and holding the latch pins against separation by the force applied by the spring.

2. The compound leverage hand tool of claim 1 wherein the retention slots open longitudinally away from the hand grips.

3. The compound leverage hand tool of claim 2, wherein the handles have an inwardly opening u-shaped cross section and each of the tool head latches have an inwardly opening u-shaped cross section and conformingly engage exterior surfaces of the handles.

4. The compound leverage hand tool of claim 3 wherein the locking fingers extend laterally inwardly and are each bifurcated into locking finger components formed on opposite inwardly extending legs of their u-shaped cross section.

5. The compound leverage hand tool of claim 4, wherein the workpiece engaging members are snips blades.

6. The compound leverage hand tool of claim 4, wherein the spring is a coiled torsion spring wound around the handle pivot axis and having a pair of tines that extend into the handles, each tine engaging one of the latch pins on its inner side.

\* \* \* \* \*